(12) United States Patent
Brncic et al.

(10) Patent No.: US 8,970,071 B2
(45) Date of Patent: Mar. 3, 2015

(54) METHOD AND SYSTEM FOR DISCONNECTING A GENERATOR FROM A POWER SYSTEM

(71) Applicants: Ivo Brncic, Vasteras (SE); Soren Forsman, Vasteras (SE)

(72) Inventors: Ivo Brncic, Vasteras (SE); Soren Forsman, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/788,642

(22) Filed: Mar. 7, 2013

(65) Prior Publication Data

US 2013/0257178 A1    Oct. 3, 2013

Related U.S. Application Data

(63) Continuation of application No. PCT/EP2010/063251, filed on Sep. 9, 2010.

(51) Int. Cl.
*H01H 47/00* (2006.01)
*H02H 3/02* (2006.01)
(Continued)

(52) U.S. Cl.
CPC ............. *H02H 3/021* (2013.01); *H02H 3/48* (2013.01); *H02H 7/06* (2013.01); *H02J 3/38* (2013.01); *H02J 2003/388* (2013.01)
USPC ......................................................... 307/125

(58) Field of Classification Search
CPC ..................................................... H02H 3/021
USPC .................................. 307/87, 125, 130, 131
See application file for complete search history.

(56) References Cited

U.S. PATENT DOCUMENTS

| 4,229,694 A | 10/1980 | Wilson et al. |
| 6,212,446 B1 | 4/2001 | Sato |

(Continued)

FOREIGN PATENT DOCUMENTS

| CN | 1204773 A | 1/1999 |
| CN | 1404214 A | 3/2003 |

(Continued)

OTHER PUBLICATIONS

International Search Report & Written Opinion of the International Searching Authority Application No. PCT/EP2010/063251 Completed: Apr. 8, 2011; Mailing Date: Apr. 15, 2011 11 pages.

(Continued)

*Primary Examiner* — Daniel Cavallari
(74) *Attorney, Agent, or Firm* — St. Onge Steward Johnston & Reens LLC

(57) ABSTRACT

A method for disconnecting a generator from a power system when the generator and the thereto connected power system are non-synchronized. The method includes the steps of: determining that there is a loss of synchronization between the generator and the power system, which loss of synchronization provides an amplitude variation of an electrical parameter associated with the generator. The method further includes determining when a minimum amplitude of the electrical parameter will occur, wherein when the occurrence of the minimum amplitude has been predicted, providing a command signal for disconnecting the generator from the power system, wherein the command signal is provided prior to the minimum amplitude of the electrical parameter is attained, and disconnecting the generator from the power system approximately when the determined minimum amplitude of the electrical parameter occurs. It is also presented a protection system for a generator in a power system.

6 Claims, 3 Drawing Sheets

(51) Int. Cl.
  *H02H 3/48* (2006.01)
  *H02H 7/06* (2006.01)
  *H02J 3/38* (2006.01)

(56) References Cited

U.S. PATENT DOCUMENTS

| | | | |
|---|---|---|---|
| 7,453,674 | B2 | 11/2008 | Kuehnle et al. |
| RE43,698 | E * | 10/2012 | Hudson .......................... 290/44 |
| 8,294,288 | B2 * | 10/2012 | Rivas et al. ..................... 290/44 |
| 8,674,683 | B2 * | 3/2014 | Schweitzer et al. .......... 324/160 |
| 2004/0090719 | A1 | 5/2004 | Larsson et al. |
| 2007/0257561 | A1 | 11/2007 | Karlsson et al. |
| 2007/0282548 | A1 * | 12/2007 | Ling et al. ........................ 702/65 |
| 2008/0232005 | A1 | 9/2008 | Kuehnle et al. |
| 2009/0091303 | A1 | 4/2009 | Schweitzer, III et al. |
| 2012/0063039 | A1 | 3/2012 | Shah et al. |

FOREIGN PATENT DOCUMENTS

| | | |
|---|---|---|
| DE | 3520347 A1 | 12/1986 |
| EP | 0869599 A2 | 10/1998 |
| GB | 557974 A | 12/1943 |
| GB | 2318913 A | 5/1998 |
| RU | 2025020 C1 | 12/1994 |
| RU | 2285308 C2 | 10/2006 |
| SU | 1098067 A1 | 6/1984 |
| WO | 2009074181 A1 | 6/2009 |

OTHER PUBLICATIONS

International Preliminary Report on Patentability and Written Opinion (with separate sheet) of the International Searching Authority Application No. PCT/EP2010/063251 Completed: Mar. 12, 2013 10 pages.
Office Action From China Application No. 201080069051.X Mailing Date: Jul. 18, 2014 pp. 17.
Chen Xiying et al.; "Study on Power System Out-of-Step and Splitting"; Relay, vol. 34, issue 8, pp. 30-34, and p. 66; Apr. 16, 2006.
Decision on Grant Patent for Invention Russian Patent Application No. 2013115764/07(023396) Issued: Jun. 3, 2014 14 pages.

* cited by examiner

METHOD AND SYSTEM FOR DISCONNECTING A GENERATOR FROM A POWER SYSTEM

FIELD OF THE INVENTION

The invention generally relates to protection of electrical equipment in a power system and in particular to disconnecting a generator from a power system when the generator and the power system fall out of synchronization.

BACKGROUND OF THE INVENTION

Generators, which may provide electrical power in a power system, are normally sensitive to disturbances in the operating conditions of the power system to which they are connected.

A disturbance or a fault condition in the power system may give rise to an out-of-step condition, i.e. the loss of synchronization between different areas within a power system, or alternatively loss of synchronization between e.g. two interconnected power systems.

During an out-of-step condition, high peak currents, off-frequency operation, and pulsating torques due to the rotor angle varying between 0 and $2\pi$ radians may cause electrical and mechanical stress to the generator. By rotor angle is meant the angle between the magnetic axis' of the rotor and the stator of the generator.

When a synchronous generator loses synchronization, i.e. when an out-of-step fault occurs, the rotor flux loses grip of the stator flux, whereby the rotor angle will change. As a result, the generator loses torque. The rotor speed will then increase, as will the generated currents. A pulsating torque may be a result of the variation of the rotor angle. In this situation, it is normally desirable to disconnect the generator from the power system so as to prevent damage to the generator.

Typically, circuit breakers are provided at the generator end of the power system. Circuit breakers, at least one provided for each electrical phase, serve to disconnect the generator from the power system when a fault condition occurs so as to break the current path in the affected part of the power system. In order to function properly, the circuit breakers should be exposed to as little electrical and mechanical stress as possible.

In current solutions for reducing the stress on the circuit breakers, as well as on the generator, the generator is disconnected from the power system after a predetermined number of torque pulses after an out-of-step condition has been detected. The generator is hence subject to severe conditions until the circuit breakers disconnect the generator from the power system. A drawback with the current solution is that the circuit breakers as well as the generator are exposed to high stress prior to disconnecting the generator from the power system.

SUMMARY OF THE INVENTION

An object of the present invention is to provide an improved method and system for disconnecting a generator from a power system at an out-of-step condition. To this end, an object is to provide a method and system such that the generator and circuit breakers be subject to less stress than with current methods when disconnecting the generator from the power system.

Another object of the present invention is to provide a method and system that can predict a minimum amplitude of an electrical parameter associated with the generator when the amplitude of the electrical parameter varies due to a variation of the rotor angle when the generator and the power system of which it is part of and connected to has lost synchronization.

A power system as defined herein generally comprises generators for generating electric power, a transmission system for carrying the power from the generators, and a distribution system for distributing the power to its end-users. A power system herein may also be of smaller size, e.g. a local power network in an industry.

In a first aspect of the present invention, there is provided a method for disconnecting a generator from a power system when the generator and the thereto connected power system are non-synchronized, wherein the method comprises the steps of:

determining that there is a loss of synchronization between the generator and the power system, which loss of synchronization provides an amplitude variation of an electrical parameter associated with the generator, wherein a frequency of the amplitude variation is proportional to a rotor angle variation of the generator, which variation of the rotor angle arises due to the loss of synchronization between the generator and the power system, determining when a minimum amplitude of the electrical parameter will occur, wherein when the occurrence of the minimum amplitude has been predicted, providing a command signal for disconnecting the generator from the power system, wherein the command signal is provided prior to the minimum amplitude of the electrical parameter is attained, and disconnecting the generator from the power system approximately when the determined minimum amplitude of the electrical parameter occurs.

An effect which may be obtainable by disconnecting the generator approximately when the minimum amplitude of the electrical parameter occurs is that the generator will be subject to less electrical and mechanical stress when disconnecting the generator from the power system. Further, since the disconnection takes place approximately when the electrical parameter has attained its minimum amplitude, even a less accurate prediction of the occurrence of the minimum amplitude will not account for a large deviation in magnitude of the electrical parameter. Additionally, by disconnecting the generator from the power system when the amplitude of the signal is approximately at its minimum, the electric and magnetic fields will also be at their minimum thus providing minimal impact on the generator when the generator is disconnected from the power system.

The step of determining when the minimum amplitude will occur may involve determining a slope of the amplitude variation so as to allow predicting when the minimum amplitude will occur. By determining the slope of the amplitude variation, the minimum may be more accurately determined.

The step of determining when the minimum amplitude will occur may involve determining the frequency of the amplitude variation so as to allow predicting when the minimum amplitude will occur. By determining the frequency of the amplitude variation, the minimum may be more accurately determined.

The step of determining when the minimum amplitude will occur may involve determining the occurrence of a first minimum amplitude of the electrical parameter. Hereto, the disconnecting may involve disconnecting the generator from the power system approximately when the first minimum amplitude of the electrical parameter is attained. Thereby, the generator may be disconnected from the power system at the first minimum, wherein the generator will be subject to minimal stress.

The electrical parameter may be an impedance associated with the generator. Alternatively, the electrical parameter may be a stator current of the generator.

The command signal may be provided to at least one circuit breaker for performing the step of disconnecting the generator from the power system. Beneficially, also the circuit breaker will be subject to minimal electrical and mechanical stress due to the disconnecting occurring when the minimum of the time-varying electrical signal is obtained.

In a second aspect of the present invention there is provided a protection system for a generator connected to a power system, the protection system comprising:
- a measuring unit arranged to measure an electrical parameter associated with the generator;
- a processing unit arranged to: determine that there is a loss of synchronization between the generator and the power system based on the measured electrical parameter, which loss of synchronization provides an amplitude variation of the electrical parameter, wherein a frequency of the amplitude variation is proportional to a rotor angle variation of the generator, which variation of the rotor angle arises due to the loss of synchronization between the generator and power system and to predict when a minimum amplitude of the electrical parameter will occur; and
- at least one circuit breaker,
- wherein the processing unit is arranged to provide a command signal to the at least one circuit breaker prior to the minimum amplitude is attained, to disconnect the generator from the power system so as to allow for the at least one circuit breaker to disconnect the generator from the power system approximately when the minimum amplitude occurs.

The processing unit may be arranged to determine a first attained minimum amplitude of the measured electrical parameter after the loss of synchronization is determined, wherein the command signal is generated so as to disconnect the generator approximately when the first minimum occurs.

The processing unit may be arranged to determine a slope of the amplitude variation so as to predict when the minimum amplitude will occur.

The processing unit may be arranged to determine the frequency of the amplitude variation so as to predict when the minimum amplitude will occur.

Additional possible features and preferred embodiments are set out and disclosed in the following.

BRIEF DESCRIPTION OF THE DRAWINGS

The invention and further advantages thereof will now be described in more detail with reference to the accompanying drawings of which.

DETAILED DESCRIPTION OF THE INVENTION

Figure 1:
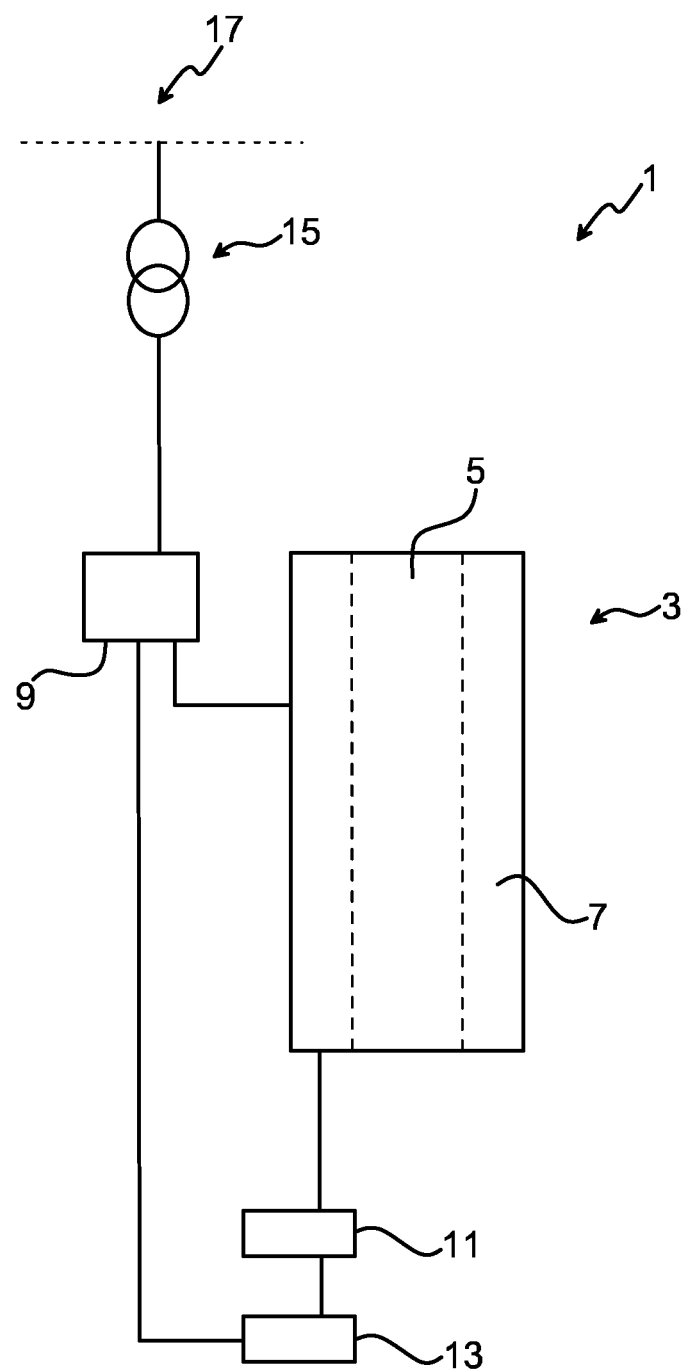
FIG. 1 shows a schematic diagram of a protection system for a generator according to the present invention.

FIG. 1 illustrates a protection system 1 for a generator 3. The system 1 comprises the generator 3, a plurality of circuit breakers 9, a measuring unit 11 and a processing unit 13. The measuring unit and the processing unit may in one embodiment be integrated into one unit (not shown). The generator 3 is typically a synchronous generator.

The generator 3 comprises a rotor 5 and a stator 7. The rotor 5 is illustrated schematically in FIG. 1 with dashed lines inside the stator 7. The rotor 5 typically has rotor windings to electrically magnetize the rotor. Alternatively, the rotor 5 may comprise a permanent magnet.

The stator 7 has stator windings, which are not shown in FIG. 1. The rotor windings and stator windings interact as the rotor rotates. Typically, a rectified alternating current or a dc current is applied to the rotor windings so as to induce a magnetic field in the rotor windings and magnetize the rotor 5. Thereby, a magnetic field and stator currents will be induced in the stator windings and a stator body of the stator when the rotor 5 rotates in the stator 7. In preferred embodiments, the generator 3 is a 3-phase generator. In alternative embodiments, the generator may be a 6-phase generator or the generator may have any suitable number of stator winding pairs, i.e. having any suitable number of phases.

The circuit breakers 9 are connected to the generator 3 and to a power system 17 via a transformer 15. The circuit breakers 9 hence serve as an interface between the power system 17 and the generator 3. The power system 17 may be exemplified by an electrical grid. In a typically configuration, one circuit breaker 9 is connected to each phase of the generator 3. In this case there is hence a one-to-one correspondence between circuit breakers and electrical phases.

Beneficially, the protection system 1 allows for the protection of the generator 3 and the circuit breakers 9 from high electrical and mechanical stress upon disconnection of the generator 3 from the power system 17 when there is a loss of synchronism between the generator 3 and the power system 17.

A fault condition in the power system 17, such as a short-circuit caused by e.g. a fault to ground, may cause the generator 3 to fall out-of-step with the power system 17, i.e. there may be a loss of synchronization between the generator 3 and the power system 17. In one embodiment, the measuring unit 11 measures the stator current and the stator voltage between each pole pairs of the stator 7. The measuring unit 11 may be any type of device suitable for measuring currents and voltages in a generator generating voltages in a large high voltage power system, or a generator for a smaller power system carrying lower voltages.

In one embodiment, the measuring unit 11 measures the stator current and stator voltage continuously.

In an alternative embodiment, the stator current and stator voltage measurements are triggered by an event in the power system 17. Such an event may give rise to stator voltage and stator current values that differ from a predetermined voltage and current amplitude range.

When a fault occurs, the stator current and the stator voltages will deviate from their normal values which arise under the normal operation of the power system 17 and generator 3. The measuring unit 11 is connected to, or integrated with, the processing unit 13. The processing unit 13 is typically a device which can process digital data relating to and converted from the signals measured by the measuring unit 11.

The processing unit 13 analyzes data pertaining to the signals measured by the measuring unit 11. Upon the detection of a fault condition in the power system 17, the processing unit 13 determines from measured data the out-of-step condition.

At an out-of-step condition, a characteristic pulsating pattern of the output signals of the generator, i.e. the stator current and stator voltage, arise at the stator poles. Further, an impedance which is detectable at the generator typically starts to vary. Each of the stator current, the stator voltage, and the impedance constitute electrical parameters associated with the generator.

The output signals of the stator poles typically have an essentially constant frequency of 50 Hz or 60 Hz during normal operation, depending on the geographical region of the power system and generator. The frequency may fluctuate a small amount from the 50 Hz or 60 Hz depending on the applied load.

As explained in the background section, the pulsating pattern is related to the rotor angle variation when the rotor flux and stator flux have lost grip with each other. As a result, the output signals of the stator poles, and an impedance associated with the generator will have amplitudes that vary in time. The output signals of the stator poles may be seen as amplitude modulated signals, each phase being modulated with a frequency proportional to the variation of the rotor angle. The modulation frequency is typically much lower than the frequency of the output signals. For instance, the modulation frequency may be of an order 10 lower than the output signals of the stator poles. The modulation signal, i.e. the amplitude variation of the output signals is essentially periodic when seen over a short period of time. The amplitude variation, which may be seen as pulses i.e. "half periods" of the modulation signal, will however normally become shorter and shorter with time.

Upon determining that there is an out-of-step condition, the processing unit 13 in one embodiment determines when an electrical parameter associated with the generator 3 and which electrical parameter due to the out-of-step condition has varying amplitude will attain its minimum value. In one embodiment, the electrical parameter is impedance associated with the generator 3.

The minimum of the electrical parameter is determined based on measurements of the stator current and stator voltage measured by the measuring unit 11. The impedance may be determined by an algorithm utilizing Ohm's law. The determining of the minimum impedance may be predicted by determining a slope of varying impedance and by determining the frequency of the variation in amplitude of the impedance. Thereby, the end of a pulse, or half period, may be predicted.

In an alternative embodiment, the stator current or stator voltage constitute the electrical parameter. Hence one of the stator current and stator voltage may be utilized to determine when the minimum amplitude of the electrical parameter, i.e. the stator current or stator voltage, will occur.

The processing unit 13 is arranged to send a command signal to the circuit breakers 9, to which the processing unit 13 is connected, when the time for the minimum has been predicted. The command signal is sent prior to the predicted minimum so as to allow for the time needed for the circuit breakers 9 to mechanically disconnect the generator 3 from the power system 17. In a typical embodiment, it is possible to set the time for when to send the command signal from the processing unit 13 for opening the circuit breakers and thereby disconnecting the power system from the generator approximately when the minimum is attained. The time that is set will normally depend on the type of circuit breakers used in the system.

In one embodiment, the first minimum after the out-of-step condition has been determined is predicted. The circuit breakers 9 receive the command signal prior to the first minimum is attained, wherein the circuit breakers 9 disconnect the generator 3 from the power system 17 approximately when the first minimum occurs.

Beneficially, by disconnecting the generator 3 from the power system 17 when the minimum amplitude occurs, the generator 3 as well as the circuit breakers 9 will be subject to less electrical and mechanical stress.

Figure 2A:
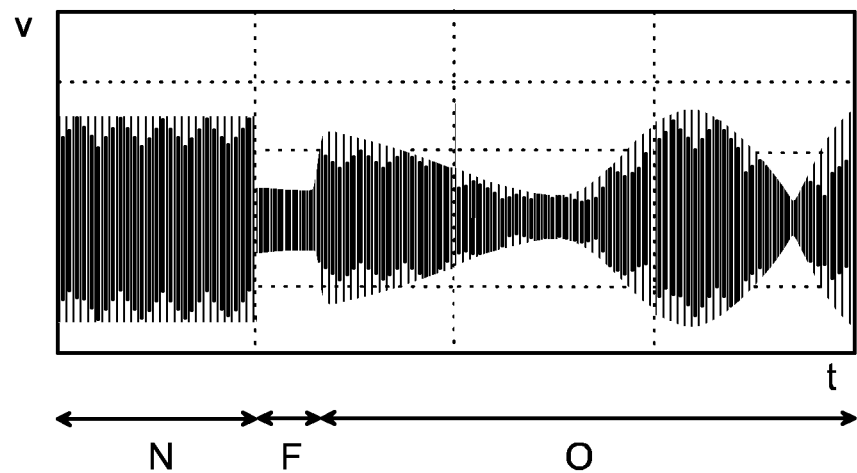
FIG. 2A-B shows graphs of time-varying electrical parameters before an out-of-step condition occurs and after the occurrence of the out-of-step condition.
Figure 2B:
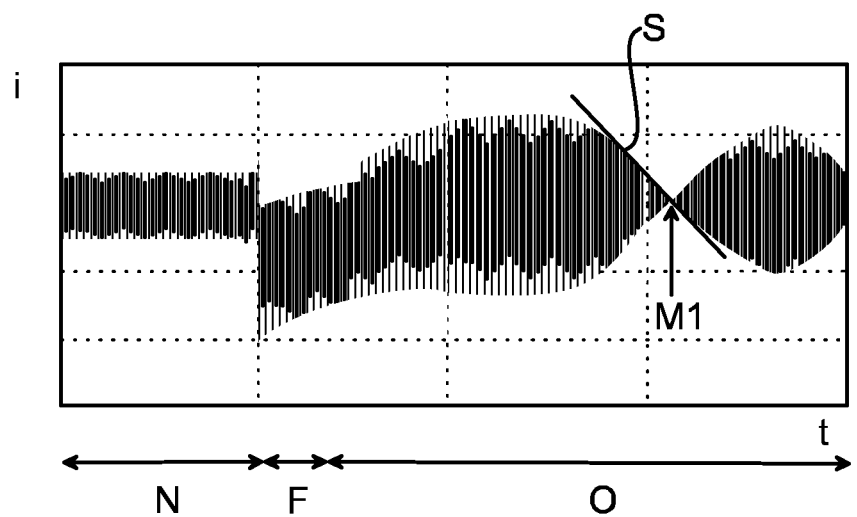

FIGS. 2a-b will provide additional information so as to facilitate the understanding of the present invention.

FIGS. 2a-b shows graphs of time-varying signals of one electrical phase measured at one of the poles of the stator 7 of the generator 3 in FIG. 1. FIG. 2a shows the evolution of the stator voltage in time in normal operation N, when a fault F occurs, and when a resulting out-of-step condition O occurs.

FIG. 2b shows the evolution of the stator current in time for the same electrical phase as the stator voltage in FIG. 2a. The stator current is shown during normal operation N, when the fault F occurs, and when the resulting out-of-step condition O occurs.

Both of FIGS. 2a and 2b show 50 Hz signals, wherein when the out-of-step condition O occurs the 50 Hz signals are amplitude modulated with a frequency lower than the frequency of the stator voltage and the stator current respectively. A slope S of the amplitude variation of the stator current is shown in FIG. 2b. Further, approximately a half period P/2 of the amplitude variation is shown. This period is typically not constant, but will become shorter and shorter with time.

As described earlier, by determining the slope and frequency of the stator impedance, or alternatively, the stator current or stator voltage, the first minimum M1 may be determined. Although the first minimum M1 here denotes the first minimum of the stator current, the principle is the same for determining the first minimum of the impedance. Thereby, a command signal may be sent from the processing unit 13 of FIG. 1 to the circuit breakers 9 so as to allow for disconnecting the generator 3 from the power system 17 to which it is connected and with which it has lost synchronism.

Figure 3:
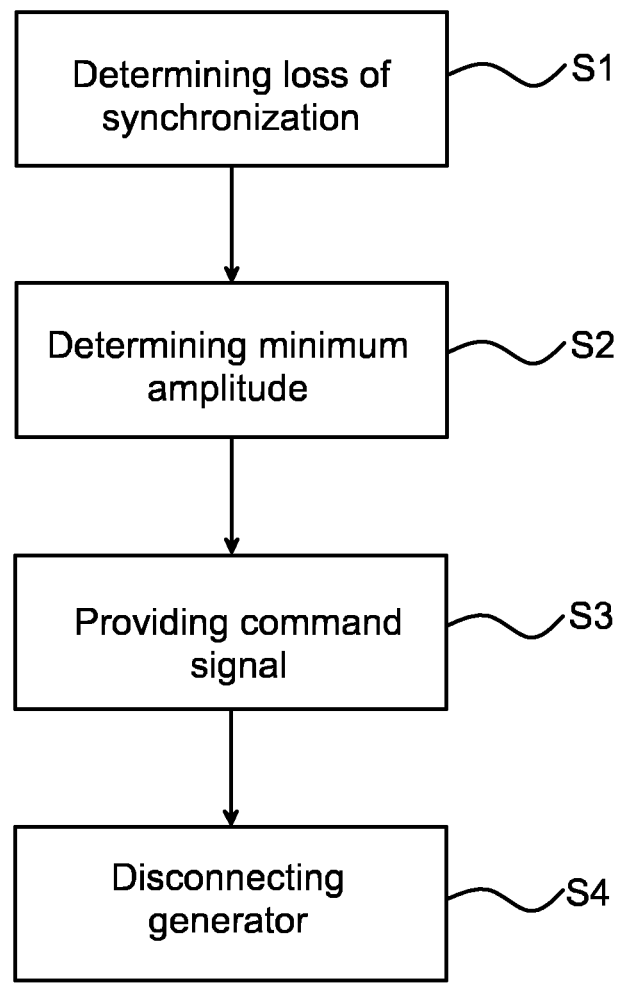
FIG. 3 shows a flowchart of a method for disconnecting a generator from a power system according to an embodiment of the invention.

FIG. 3 shows a flowchart generally describing the above-discussed method for disconnecting a generator from a power system when the generator and the thereto connected power system are non-synchronized.

A step S1 of determining that there is a loss of synchronization between the generator and the power system, which loss of synchronization provides an amplitude variation of an electrical parameter associated with the generator, wherein a frequency of the amplitude variation is proportional to a rotor angle variation of the generator, which variation of the rotor angle arises due to the loss of synchronization between the generator and the power system. The electrical parameter that is determined may be the stator current, stator voltage or impedance related to the stator current and stator voltage.

A step S2 of determining when a minimum amplitude of the electrical parameter will occur, wherein when the occurrence of the minimum amplitude has been predicted.

A step S3 of providing a command signal for disconnecting the generator from the power system, wherein the command signal is provided prior to the minimum amplitude of the electrical parameter is attained.

A step S4 of disconnecting the generator from the power system approximately when the determined minimum amplitude of the time-varying electrical parameter occurs.

While the invention has been described by means of a few examples, it is to be understood that the invention may be varied within the scope of the appended claims.

What is claimed is:

1. A method for disconnecting a generator from a power system when the generator and the power system connected thereto are non-synchronized, the method comprises the steps of:
   measuring an electrical parameter of a stator of the generator with a voltage and current measuring device;
   transmitting an output signal from the voltage and current measuring device to a processing unit, the processing unit:
   determining a loss of synchronization between the generator and the power system by detecting an amplitude variation of the electrical parameter measured from the generator, wherein a frequency of the amplitude variation is proportional to a rotor angle variation of the generator, the rotor angle variation arising due to the loss of synchronization between the generator and the power system;
   determining a slope or a frequency of the amplitude variation to determine when a minimum amplitude of the electrical parameter will occur;
   transmitting a command signal to at least one circuit breaker electrically connected between the generator and the power system for disconnecting the generator from the power system, wherein the command signal is provided to the at least one circuit breaker prior to the minimum amplitude of the electrical parameter being attained; and
   the at least one circuit breaker disconnecting the generator from the power system when the minimum amplitude of the electrical parameter occurs.

2. The method as claimed in claim 1, wherein the electrical parameter is an impedance of the generator.

3. The method as claimed in claim 1, wherein the amplitude variation of the electrical parameter is periodic.

4. The method as claimed in claim 1, wherein the electrical parameter of the generator includes at least one of a stator current, a stator voltage, and an impedance.

5. A protection system for a generator connected to a power system, the protection system comprising:
   a voltage and current measuring unit electrically connected to a stator of the generator and measuring an electrical parameter of the generator, said voltage and current measuring unit generating an output signal indicative of the measured electrical parameter;
   a processing unit electrically connected to the measuring unit, said processing unit processing the output signal received from the measuring unit to determine whether there is a loss of synchronization between the generator and the power system; and
   at least one circuit breaker electrically connected to said processing unit, said at least one circuit breaker electrically connecting the generator to the power system when said at least one circuit breaker is closed;
   wherein said processing unit determines a loss of synchronization between the generator and the power system by detecting an amplitude variation of the electrical parameter from the output signal, and a frequency of the amplitude variation is proportional to a rotor angle variation of the generator, the rotor angle variation arising due to the loss of synchronization between the generator and power system;
   said processing unit determines when a minimum amplitude of the electrical parameter will occur by determining a slope or a frequency of the amplitude variation; and
   said processing unit transmits a command signal to said at least one circuit breaker, prior to the minimum amplitude being attained, to disconnect the generator from the power system by the at least one circuit breaker disconnecting the generator from the power system when the minimum amplitude occurs.

6. The protection system as claimed in claim 5, wherein the electrical parameter of the generator includes at least one of a stator current, a stator voltage, and an impedance.

* * * * *